United States Patent
Matz et al.

(10) Patent No.: US 7,234,113 B1
(45) Date of Patent: Jun. 19, 2007

(54) PORTABLE USER INTERFACE FOR PRESENTATION OF INFORMATION ASSOCIATED WITH AUDIO/VIDEO DATA

(75) Inventors: David J. Matz, Hillsboro, OR (US); Manoharan S. Vellalapalayam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/342,765

(22) Filed: Jun. 29, 1999

(51) Int. Cl.
*G06F 13/00* (2006.01)
*G06F 15/00* (2006.01)

(52) U.S. Cl. .................. 715/738; 715/740; 709/219

(58) Field of Classification Search ........... 345/719, 345/716; 715/763, 765, 853, 854, 513, 738, 715/737, 740; 709/218, 219
See application file for complete search history.

(56) References Cited

U.S. PATENT DOCUMENTS

| | | | | |
|---|---|---|---|---|
| 5,379,366 A | * | 1/1995 | Noyes | 706/55 |
| 5,572,643 A | * | 11/1996 | Judson | 709/218 |
| 5,838,906 A | * | 11/1998 | Doyle et al. | 709/202 |
| 5,929,857 A | * | 7/1999 | Dinallo et al. | 345/840 |
| 5,996,000 A | * | 11/1999 | Shuster | 709/201 |
| 6,188,401 B1 | * | 2/2001 | Peyer | 345/805 |
| 6,225,993 B1 | * | 5/2001 | Lindblad et al. | 345/716 |
| 6,226,672 B1 | * | 5/2001 | DeMartin et al. | 709/219 |
| 6,314,565 B1 | * | 11/2001 | Kenner et al. | 717/171 |
| 6,449,661 B1 | * | 9/2002 | Fujishima | 710/5 |

OTHER PUBLICATIONS

Nancy Cluts, Microsoft Corporation, *Activex Controls Overview*, 1-3, printed from web site http://msdn.microsoft.com (Oct. 23, 1998).

Microsoft Corporation, *Server Operating System: A Technology Overview*, 1-11, printed from web site http://www.microsoft.com (Aug. 15, 1998).

* cited by examiner

*Primary Examiner*—Cao (Kevin) Nguyen
(74) *Attorney, Agent, or Firm*—Trop, Pruner & Hu, P.C.

(57) ABSTRACT

A method and apparatus is provided for displaying information (e.g., statistical information, status information, video images, etc.) associated with audio/video data in a user interface created in a browser window. A browser may download a markup language file associated with a script, the script being executable to create the user interface in the browser. The user interface includes display components to display the information associated with the audio/video data. The user interface also includes control components to control a source containing the audio/video data, which may include a compact disc (CD) drive, a digital video disc (DVD) drive, or other media.

23 Claims, 5 Drawing Sheets

PORTABLE USER INTERFACE FOR PRESENTATION OF INFORMATION ASSOCIATED WITH AUDIO/VIDEO DATA

BACKGROUND

The invention relates generally to presenting information associated with audio and/or video data, such as statistical and status information and video images.

The ability to present multimedia data (including audio, video, and other related data) is increasingly becoming common in computers and other types of systems. For example, many computers include compact disc (CD) and digital video disc (DVD) players to receive audio and video data stored on CDs and DVDs.

Dedicated programs may be loaded into a computer or other types of systems to control presentation of information from the CD and DVD drives. For example, a CD player program may allow a user to play music tracks on a CD, while a DVD player program may allow a user to play a motion picture on a DVD. Typically, a user interface presented by a CD player program includes a control area for user input and display of statistical information (track number, time remaining, and so forth) and status information (CD player playing, stopped, and so forth). A user interface presented by a DVD program may also include a display area to show video images along with a control area similar to that of the CD player program to control the DVD drive as well as to view statistical and status information relating to the DVD.

However, such conventional CD or DVD programs may not be portable across different platforms (e.g., those with different operating systems). As a result, different versions of such programs may be needed for use with multiple platforms. Also, user interfaces for CD and DVD drives are not easily customizable by a user. Aside from the options that may be presented to a user in a typical CD or DVD program, further changes may be difficult to modify. Changing a user interface may not be possible unless access is made available to a program's source code.

Thus, a need arises for more flexible user interface mechanisms for presentation of information associated with audio and/or video data.

SUMMARY

In general, according to one embodiment, a method of displaying information associated with audio/video data includes loading a file with a browser and creating an interface in the browser based on instructions associated with the file. Information associated with the audio/video data is received from a source, and the information is displayed in the interface.

Other features and embodiments will become apparent from the following description and from the claims.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible.

Figure 1:
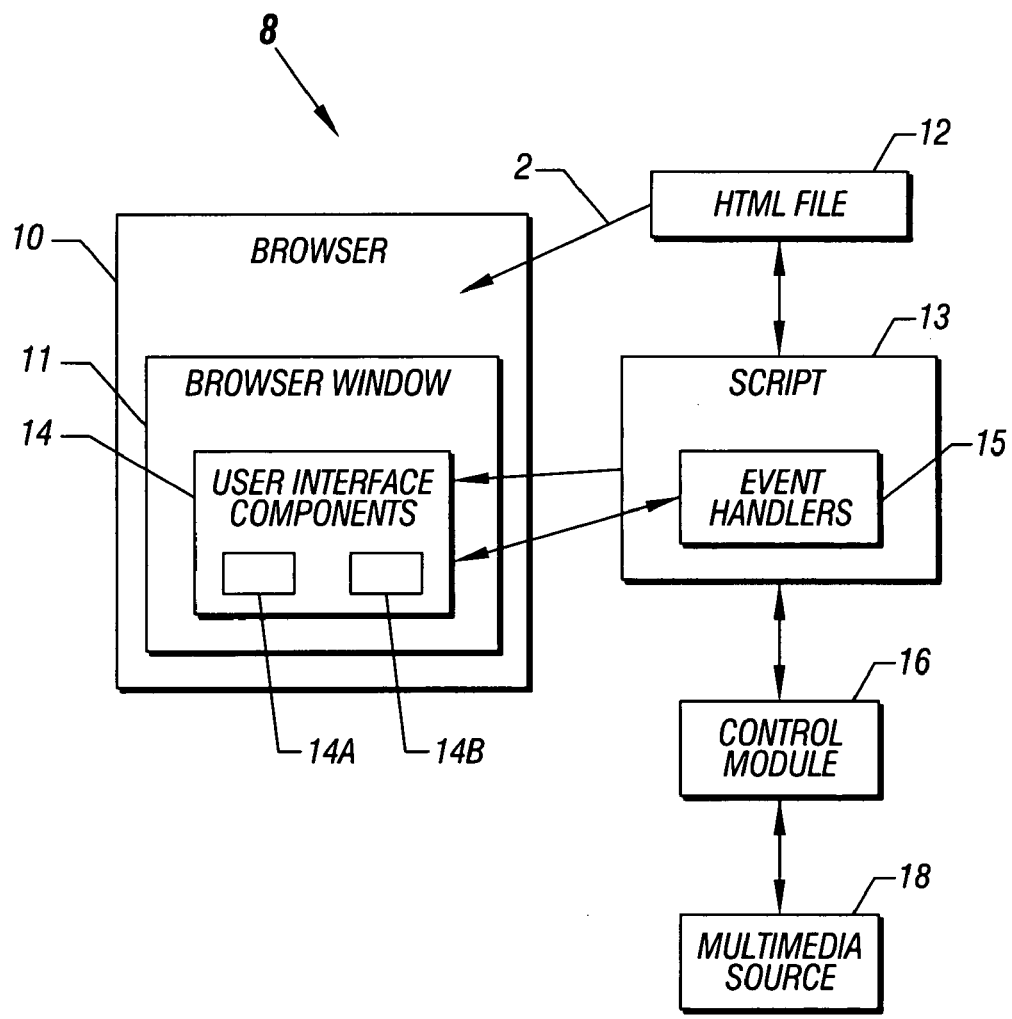
FIG. 1 shows a system including a browser with an interface for presenting information associated with audio/video data in accordance with one embodiment of the invention.

Referring to FIG. 1, an embodiment of a system 8 is shown which may be a computer or any other type of device suitable for presenting audio and/or video data, such as set-top boxes, game systems, and the like. The system 8 may include a browser 10 that is capable of accessing information on an electronic communications network, such as the Internet or other type of network, including local area networks (LANs) and wide area networks (WANs). The browser 10 may be any conventional browser such as Netscape Navigator from Netscape Communications Corporation, Internet Explorer from Microsoft Corporation, or other browsers. As used here, the term "browser" includes any program, routine, module, or component (implemented in software or hardware or a combination of the two) that is capable of accessing locations on a communications network (e.g., the Internet, LAN, WAN, and so forth). In the ensuing description, although reference is made to communicating over the Internet, it is contemplated that the browser 10 may communicate over other networks in further embodiments.

The browser 10 is able to locate pages of information on the Internet based on a uniform resource locator (URL). To view a desired page, a user may enter a URL in the browser 10 or choose a link to a URL from a currently displayed page. The browser 10 may then download the desired page. A page may include a text file written in a markup language such as Standard Generalized Markup Language (SGML), an SGML subset including Extensible Markup Language (XML), or an SGML application such as Hypertext Markup Language (HTML). Other types of markup languages are also available. A version of HTML is described in "HTML 4.0 Specification," W3C Recommendation, dated April 1998. An overview of SGML guidelines is presented in an article entitled "A Gentle Introduction to SGML" at the web site {http://www-tei.uic.edu/orgs/tei/sgml/index.html}. A version of XML is described in "Extensible Markup Language (XML™) 1.0," World Wide Web Consortium (W3C) Recommendation, dated February 1998, and available at {http://www.w3.org}.

An HTML file typically includes markup instructions regarding how text is to be displayed in a browser window 11. The HTML file may prescribe several characteristics of the text including the font, point size, color, and location within the browser window 11. Conventional HTML files may also provide information regarding the display of graphics and images. The browser 10 may thus display text and graphics in the browser window 11 according to instructions in the HTML file.

The browser 10 may download an HTML file 12 over path 2 from a source (e.g., a location on the Internet, a location on another type of network, or a local storage device in the system 8). In addition to instructions specifying display of text and images, the HTML file 12 may also be accompanied by a script 13, which is a program or collection of instructions that may be part of the HTML file 12 or separate from but associated with the HTML file 12. An HTML file that is associated with a script may be referred to as a scripted HTML file. The script 13 may be executed in response to a number of events, including: loading of the HTML file 12, a user action in the browser 10, receipt of message from another module in the system, and so forth. The scripting language used to create the scripts is flexible and can be user-specified. Although reference is made to a singular script 13 in the described embodiment, it is contemplated that multiple scripts may be attached to the HTML file 12 in further embodiments.

In accordance with some embodiments, the script 13 may be executable at the time the HTML file 12 is loaded to create user interface components 14 for an interface in the browser window 11. The user interface components 14 include display components 14A to present displayable information associated with multimedia data stored in a source 18. The user interface components also include control components 14B to control presentation of the multimedia data in the source 18. As used here, the term "multimedia data" may include audio and/or video data (hereinafter "audio/video data"). Audio/video data may include audio and video data as well as one of audio and video data. Displayable information associated with the audio/video data may include statistical information about the audio/video data (e.g., time remaining, track number, language, etc.), status information, and other related information. Further, the displayable information may also include video images. The multimedia data stored in the source 18 may be stored on a CD, a DVD, or some other storage source (e.g., a hard disk drive or other storage element in the system 8 or a storage device located over a network).

Figure 4:
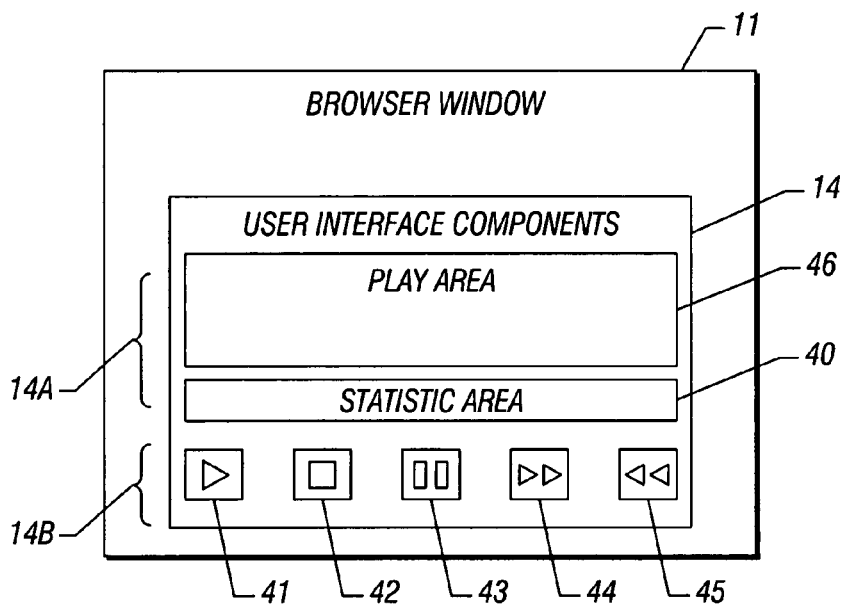
FIG. 4 shows an example interface presented in a browser window in accordance with one embodiment of the invention.

Referring to FIG. 4, an example arrangement of the user interface components 14 in the browser window 11 may include a statistics display area 40 that has a time remaining indicator to show the amount of time remaining in a music track or film, a track indicator to indicate the current track, and other statistical information. Further, status indicators may provide indications of the status of the source 18 (e.g., whether it is playing, stopped, and so forth). In addition, a play area 46 (such as for presenting video images) may be included. Although shown as taking a small portion of the browser window 11, the video play area 46 can be configured to take up most of the browser window 11 or even the entire screen of a monitor or display. As illustrated, the statistics display area 40 and play area 46 are part of the display component 14A. The user interface control components 14B may include control buttons, including a play button 41, a stop button 42, a pause button 43, a fast forward (or forward skip) button 44, and a rewind (or reverse skip) button 45. Activation of any one of the control buttons in the user interface control components 14B generates an event that triggers execution of an event handler in the script 13. A display event may also be generated in the system 8 in response to data (audio, video, and/or related information) transferred from the source 18. Additionally, a display event may be generated in response to the source 18 changing states, e.g., turning on or off, stopping, playing, etc.

The script 13 may include event handlers 15 for responding to the various events that may occur in the system 8, including display events and user input events. Such event handlers in a script when associated with an HTML file may also be referred to as HTML scripted handlers. Control event handlers 15 triggered by activation of corresponding user interface control components 14B are executed to generate control messages for controlling the source 18. One or more display event handlers 15 may be triggered by a display event (generated in response to data transferred from the source 18) to present displayable information relating to the multimedia data contained in the source 18.

A control module 16 provides the interface to the source 18. The control module 16 may include a software routine such as a Java applet or an ActiveX component. A description of Java may be found in Ivor Horton, "Beginning Java," Wrox Press Ltd. (1997). ActiveX components are elements of Microsoft's Component Object Model (COM) that provides a framework for designing reusable software components. A description of the COM model may be found in "The Component Object Model: A Technical Overview," dated October 1994, which may be found at the web site {http://www.microsoft.com/com/tech/com.asp}. ActiveX components are described in "Introduction to ActiveX Controls," which may be found at the web site {http://msdn.microsoft.com/workshop/components/default.asp}.

An ActiveX component encapsulates the data and subroutines employed to perform specific operations. ActiveX components may be linked to other software applications to perform these operations. Because ActiveX components are designed with standard interfaces for accessing the operations that the components provide, a single ActiveX component may interact with several different software applications or routines, including the event handlers 15 of the script 13. Thus, in one example, a browser 10 such as Internet Explorer that supports ActiveX control can be used to download a scripted HTML file to create the desired user interface components in the browser window 11 in which information associated with multimedia data in the source 18 may be viewed. The script 13 associated with the loaded HTML file is able to interact with the control module 16 to control presentation of multimedia data in the source 18. By employing the control module 16, the tasks of creating and interacting with the user interface components 14 in the browser window 11 (performed by event handlers 15 in the script 13) may be separated from the tasks of interfacing the source 18 (performed by the control module 16). Consequently, the script 13 including the event handlers 15 may be designed to work with any number of platforms including different types of sources 18.

The control module 16 may be loaded into the system 8 in any of a number of ways. For example, the control module 16 may be stored on magnetic or optical media for transfer into the system 8. Alternatively, the control module 16 may be downloaded by the browser 10 from a location on an electronic communications network. The control module 16 may interact with a device driver (not shown) for the source 18.

The script associated with a scripted HTML file, or portions of the file, may be easily modifiable by a user using a number of different techniques. Using HTTP over a network, the entire HTML file or a piece of the HTML file (such as a script associated with the file) may be replaced. HTTP stands for Hypertext Transfer Protocol, which is described in RFC 2068, entitled "Hypertext Transfer Protocol—HTTP/1.1," dated January 1997. This allows the user to customize the user interface components 14 in the browser window 11.

Figure 2:
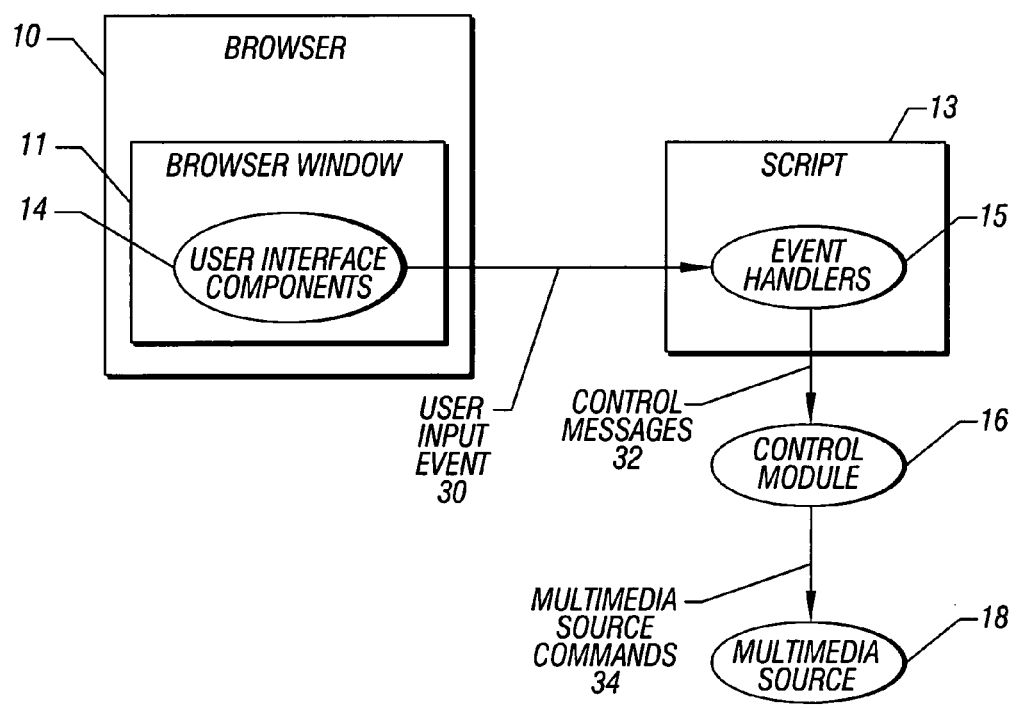
FIG. 2 shows a flow for responding to user input in the system of FIG. 1.

Referring to FIG. 2, activation of one of the control buttons in the user interface control components 14B generates a corresponding user input event 30. For example, if the source 18 includes a CD or DVD player that contains a CD or DVD, a user may activate one of the control buttons to play, stop, or perform other control operations. The same or similar control components may be used in further embodiments to control other types of media. In response to the user input event, a corresponding control event handler 15 in the script 13 is triggered to generate control messages 32 that are directed to the control module 16. Such control messages may include, for example, messages indicating that the source 18 is to be played, stopped, paused, and so forth. In turn, the control module 16 may transmit corresponding multimedia source commands 34 to the source 18 (through the device driver for the source 18). Thus, for example, a play command from the control module 16 may cause the source 18 to transfer data to the control module 16, including audio/video data, information identifying the playback position measured in reference to the beginning or end of a track, and other information. A stop or pause command may cause the source 18 to stop transferring data to the control module 16.

Figure 3:
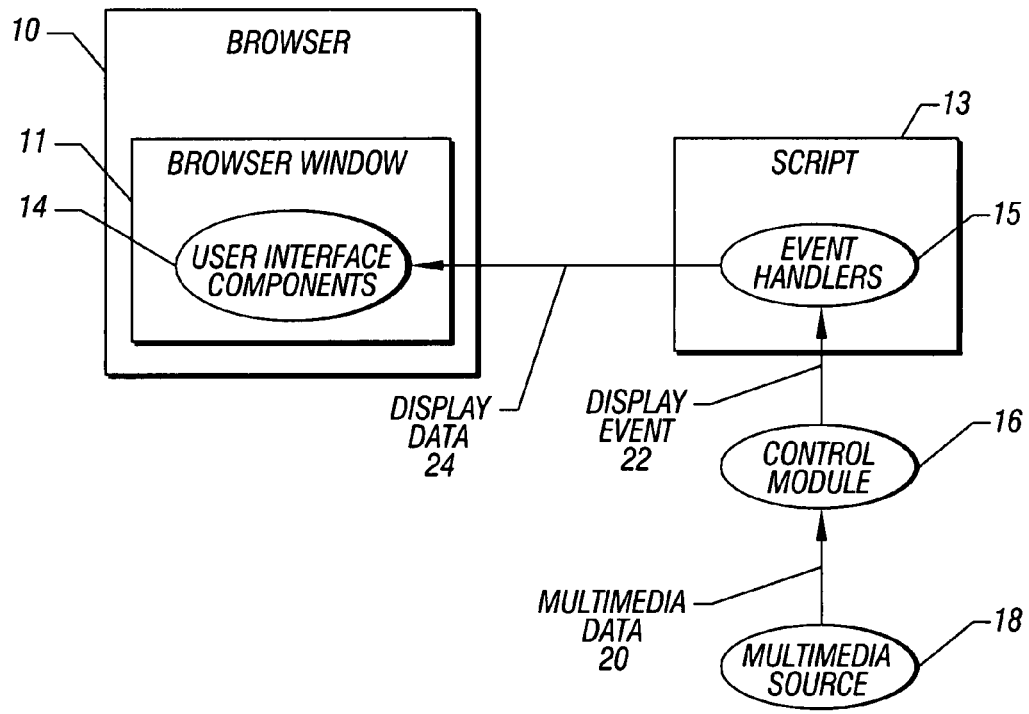
FIG. 3 shows a flow for displaying data in the system of FIG. 1.

Referring to FIG. 3, in response to the control module 16 receiving data 20 from the source 18, the control module 16 may generate a display event 22 that triggers a display event handler 15 in the script 13. Data from the source 18 may accompany the display event, which are processed by the display event handler 15 to determine statistical information, including time remaining, time elapsed, and track number based on the data identifying the current location of a CD or DVD track. A display event may also be generated in response to the source changing states, e.g., turning on or off, starting, stopping, pausing, and so forth. Such a display event may be associated with some indication of the status of the source 18 from which status information of the source 18 may be generated by the display event handler 15. The statistical and status information 24 may be sent to corresponding user interface display components 14 in the browser window 11.

Figure 5:
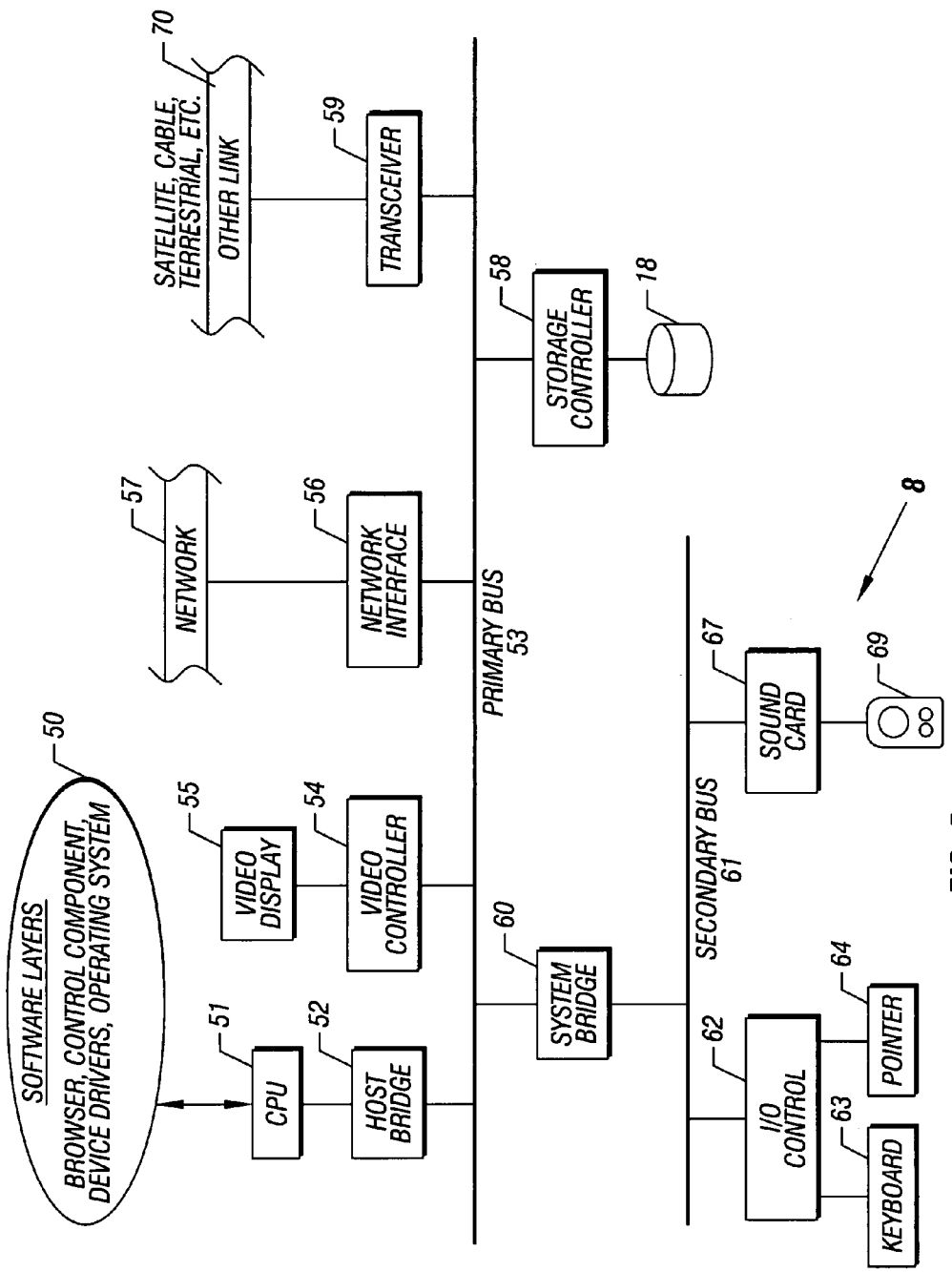
FIG. 5 is a block diagram of an embodiment of a system in which the browser of FIG. 1 may be executable.

Referring to FIG. 5, the system 8 may be a personal computer, a set-top box, or any other type of system capable of presenting multimedia data. In accordance with one embodiment, the system 8 may include several software layers 50 that are executable on a central processing unit (CPU) 51, which may be a microprocessor, microcontroller, or other control device. The software layers may include an operating system, device drivers, and application programs such as the browser 10 and the control module 16 that execute within an operating system environment. The CPU 51 may be coupled to a primary bus 53 through a host bridge 52 to communicate with other components in the system 8. A video controller 54 is also coupled to the primary bus 53 to display text and video images on a video display 55. A storage controller 58 controls access to the source 18.

In addition, a network interface 56 is coupled to the primary bus 53 to control communications with a network 57 such as a LAN, a WAN, or the Internet. The system 8 may also include a transceiver 59 coupled to the primary bus 53 through which the system may communicate with another communications link 70 such as a telephone line, satellite link, a cable link, and so forth.

The CPU 51 may interact with other hardware devices connected to a secondary bus 61 through a system bridge 60. Input devices such as a keyboard 63 and a pointer device 64 may allow a user to provide input to the system 8 through an input/output (I/O) controller 62 that is coupled to the secondary bus 61. Additionally, a sound card 67 may be coupled to the secondary bus 61 to present audio signals to a speaker 69.

In one example embodiment, the source 18 in the system 8 may be an audio source that supplies audio data. For example, the audio source may include an optical medium such as a CD or DVD that contains musical tracks or other forms of audio. Alternatively, the audio source may be an audio file located on the Internet or at another storage location, either in the system 8 itself (e.g., a hard disk drive) or in an external storage device accessible by the system 8 (such as over a network). In the embodiment including an audio source, audio data received by the control module 16 from the audio source 18 may be routed to the sound card 67 through the appropriate device driver to present audio signals onto the speaker 69. In addition, statistical and status information associated with the audio data, e.g., the name or number of the current musical track, whether the musical track is playing or stopped, the time remaining in the musical track, and so forth, as generated by a display event handler 15 may be presented in the statistics area 40 in the browser window 11 (FIG. 4). Thus, in accordance with an embodiment of the invention, while audio is being played in real time by the system 8, a user can view statistical and status information associated with the audio data in the browser window 11. As audio data is being streamed, the display event handler 15 in the script 13 can determine the associated statistical and status information and display them in the browser window 11. Additionally, the user is also able to control the playing or presentation of audio through control buttons in the browser window 11.

In another embodiment, the source 18 may be a video source supplying video data from a video file, which may be located on an optical medium such as a CD or DVD, or some other media. In this embodiment, the user interface display components 14A may include a play area 46 (FIG. 4) in the browser window 11 to display video images from the source 18. Control buttons 41–45 may be used to control presentation of the video images. Further, other control buttons may be available to a user to adjust the display of the video images (e.g., aspect ratio, etc.).

Figure 6:
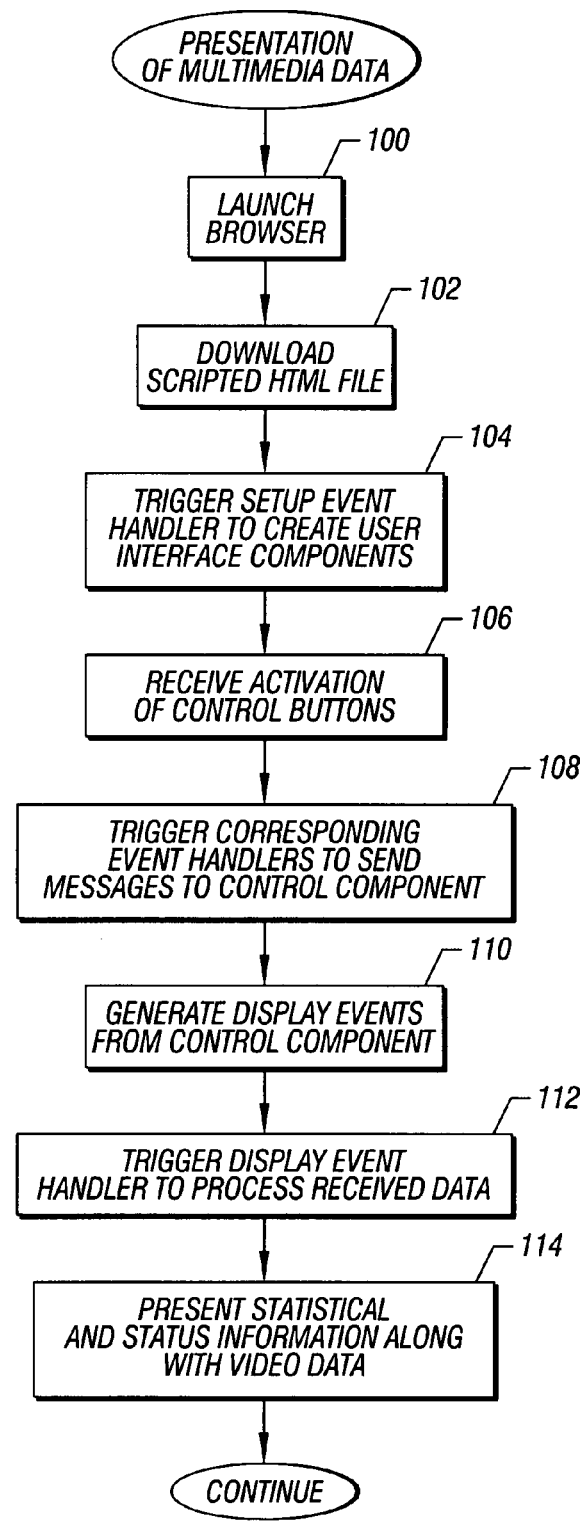
FIG. 6 is a flow diagram of the presentation of multimedia data in accordance with an embodiment.

Referring to FIG. 6, in accordance with some embodiments, to view or access multimedia data contained in the source 18, a user can launch 100 the browser 10. Next, a scripted HTML file (or some other markup language file with one or more associated scripts) can be loaded 102 into the system 8 from an internal or external storage device. This may trigger 104 a setup event handler 15 in the script 13, which sets up user interface components 14 in the browser window 11 including both control and display components. In response to activation of one of the user interface control components 106, a user input control event may be generated. This triggers control event handlers 15 in the script 13 to create and send corresponding control messages 108 to the control module 16. If the control message is to begin playing a music or video track in the source 18, the source 18 may respond by transferring data to the control module 16, which in turn generates display events 110 to trigger 112 the display event handler 15 in the script 13. The display event handler 15 processes the data received from the source 18 as discussed above and present statistical information 114, status information, and/or video images for presentation in the user interface display components 14A.

Some embodiments of the invention may include one or more of the following advantages. By employing a browser to display information associated with multimedia data such as audio and video data, and to control the source containing the multimedia data, a familiar user interface is provided to users. Convenience may be enhanced since multiple programs do not need to be separately invoked to play a CD or DVD, for example. Modifications of the interfaces in browsers may be more convenient as compared to conventional CD or DVD programs, since the script associated with a scripted HTML file may be more easily modified than source code. As a result, a user may be able to more conveniently customize a user interface in the browser to present information associated with the multimedia data. Further, a scripted HTML file may be executable on different platforms. Another benefit of some embodiments is that a control module to interface the source containing the multimedia data may be a component-based software module. By utilizing a software module such as an ActiveX control component to control access to a multimedia data source, the operations performed by an event handler such as an HTML scripted handler can be separated from the underlying operations that are performed by the control module. Further, an HTML scripted handler may be used with several different control modules. Also, the control module may be used with several different HTML scripted handlers.

Various software (formed of modules, routines, or other layers, for example), including the several layers discussed above, may be stored or otherwise tangibly embodied in one or more machine-readable storage media in the system 8. Storage media suitable for tangibly embodying software instructions may include different forms of memory including semiconductor memory devices such as dynamic or static random access memories, erasable and programmable read-only memories (EPROMs), electrically erasable and programmable read-only memories (EEPROMs), and flash memories; magnetic disks such as fixed, floppy and removable disks; other magnetic media including tape; and optical media such as CD or DVD disks. The instructions stored in the one or more storage media when executed cause the system 8 to perform programmed acts.

The software can be loaded into the system 8 in one of many different ways. For example, instructions or other code segments stored on one or more storage media or transported through a network interface card, modem, or other interface mechanism may be loaded into the system 8 and executed to perform programmed acts. In the loading or transport process, data signals that are embodied as carrier waves (transmitted over telephone lines, network lines, wireless links, cables and the like) may communicate the instructions or code segments to the system 8.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A system comprising:
   a computer to provide a browser adapted to establish a browser instance, the browser instance to display a presentation of multimedia data provided by a source external to the computer and the browser instance having a user interface; and
   a markup language file associated with a script handler and loadable by the browser instance, the script handler executable to process multimedia data received from the source for presentation to the user interface and control playback of the multimedia data by the source based on user interaction with the user interface.

2. The system of claim 1, wherein the markup language file includes a Hypertext Markup Language file.

3. The system of claim 1, wherein the source includes a compact disc drive.

4. The system of claim 1, wherein the source includes a digital video disc drive.

5. The system of claim 1, further comprising a control module adapted to provide an interface to the source.

6. The system of claim 5, wherein the control module includes an ActiveX component.

7. The system of claim 1, wherein the browser is capable of interfacing with an ActiveX component.

8. The system of claim 1, wherein the user interface includes one or more user interface control components, and wherein the script handler is triggered in response to activation of a user interface control component.

9. The system of claim 1, wherein the user interface includes one or more user interface display components to display information associated with the multimedia data.

10. A system comprising:
    a computer to provide a browser adapted to establish a browser instance having a user interface to display a presentation of the audio/video data provided by a source external to the computer; and
    a file associated with predetermined instructions, the file loadable by the browser instance and the instructions executable to display information associated with the audio/video data in the source and control playback of the multimedia data by the source based on user interaction with the user interface.

11. The system of claim 10, wherein the displayed information includes a status of the source.

12. A method comprising:
    loading a markup language file associated with a script handler;
    invoking the script handler on a computer system to create a user interface in a browser instance;
    displaying the information associated with multimedia data with the user interface in the browser instance, the multimedia data being provided by a source external to the computer system;
    displaying a presentation of the multimedia data in the browser instance; and
    controlling playback of the multimedia data by the source based on user interaction with the user interface.

13. The method of claim 12, further comprising accessing the multimedia data stored in a storage source through a control module.

14. The method of claim 13, wherein the control module includes an ActiveX component.

15. The method of claim 12, wherein the user interface includes one or more control components, the method further comprising receiving activation of a user interface control component to control a source containing the multimedia data.

16. A method, comprising:
    in a computer system, providing a browser instance;
    loading a file into the browser instance;
    creating a user interface in the browser instance based on instructions associated with the file;
    receiving multimedia data from a source external to the computer system;
    displaying information associated with the multimedia data in the instance;
    displaying a presentation of the multimedia data in the instance; and
    controlling the source to control playback of the multimedia data by the source based on user interaction with the user interface.

17. The method of claim 16, wherein the file includes a Hypertext Markup Language file.

18. The method of claim 16, further comprising accessing the multimedia using a control module.

19. The method of claim 18, wherein the control module includes an ActiveX component.

20. An article including one or more machine accessible storage media storing instructions for presenting audio/video data, the instructions when executed causing a system to:
   generate a user interface in a browser instance, wherein the user interface is created by a scripted markup language file;
   receive multimedia data from a source external to the system;
   display information associated with the multimedia data in the interface;
   present the multimedia data in the browser instance; and
   control the source to control playback of the multimedia data based on user interaction with the user interface.

21. The article of claim 20, wherein the file includes a Hypertext Markup Language file.

22. The article of claim 20, the storage media storing instructions to cause the system to access the multimedia data using a control module.

23. The article of claim 22, wherein the control module includes an ActiveX component.

* * * * *